United States Patent [19]

Monpetit

[11] 3,946,709

[45] Mar. 30, 1976

[54] TACHOMETRIC AND ANGULAR PROGRAMMING SYSTEM FOR ROTARY DEVICE

[75] Inventor: Louis Monpetit, L'Etang-la-Ville, France

[73] Assignee: Societe des Procedes Modernes d'Inject Sopromi, Clichy, France

[22] Filed: Oct. 8, 1974

[21] Appl. No.: 513,046

[30] Foreign Application Priority Data

Oct. 17, 1973 France .............................. 73.37020

[52] U.S. Cl. ..................... 123/117 R; 123/146.5 A
[51] Int. Cl.² ........................................... F02P 5/04
[58] Field of Search .... 123/117 R, 32 EA, 146.5 A, 123/148 E

[56] References Cited
UNITED STATES PATENTS

| | | | |
|---|---|---|---|
| 3,454,871 | 7/1969 | Nolting ............................ | 123/117 R |
| 3,749,073 | 7/1973 | Asplund .......................... | 123/117 R |
| 3,752,139 | 8/1973 | Asplund .......................... | 123/117 R |
| 3,831,563 | 8/1974 | Brittain et al. ................. | 123/32 EA |
| 3,855,973 | 12/1974 | Scofeild ....................... | 123/146.5 A |
| 3,898,962 | 8/1975 | Honig et al. ..................... | 123/148 E |
| 3,908,616 | 9/1975 | Sasayama ....................... | 123/117 R |

Primary Examiner—Charles J. Myhre
Assistant Examiner—Paul Devinsky
Attorney, Agent, or Firm—Darby & Darby

[57] ABSTRACT

A tachometer and angular progression measuring system for a rotary device of the type including a pickup for producing a pulse each time the rotary device has rotated a given angle which includes a source of first pulses of a first frequency synchronized to the pulses from the pickup, means for counting the number of first pulses occurring between two successive pickup pulses, a source of second pulses of a higher frequency than the first pulses, and a means for producing output pulses whose period between two successive pulses correspond to a number of periods between successive second pulses depending on the number of first pulses counted by the counting means.

11 Claims, 8 Drawing Figures

TACHOMETRIC AND ANGULAR PROGRAMMING SYSTEM FOR ROTARY DEVICE

The invention relates to a tachometric and angular programming system for a rotary device, such as the shaft of an engine.

In a rotary device it is often useful to know its speed, and also to be able to control a phenomenon during an angular sequence of the rotation of the device.

The known types of tachometric systems are extremely numerous and of widely divergent natures, for example, mechanical, electric and electronic. The purpose of the present invention is to provide a tachometer system that produces in quasi-numerical form a number which is a function of the speed, and more particularly proportional to the speed, of the rotary device. It is known to do this with the use of pulses produced by a generator, or pick-up, of a number of different types placed on the shaft whose speed is to be measured, and to count, for example, during a given time, the number of pulses that have appeared. Such a method, however, leads to practical difficulties when it is necessary to evaluate the speed over a short time with precision. To do this it becomes necessary to increase the number of pulses delivered per revolution of the rotating shaft to a degree that quickly becomes unacceptable.

It is also known to evaluate the speed by measuring the time separating, for example, two successive pulses delivered by the pick-up, when the geometric angle separating the two pulses on the shaft is known. In this case, of course, the response is hyperbolic making it more difficult to process the information desired.

The system of the present invention contemplates the use of a purely numerical method of making available pulses of a frequency proportional to the speed of rotation, but higher to a desired extent than the frequency normally produced by a pick-up.

The object of the invention is to provide a tachometric, or angular programming, system for a rotary device. The system includes a pick-up for delivering a pulse each time the rotaty device has rotated through a given angle, a first source of fixed-frequency pulses, a device for counting the number of pulses emerging from the said first source during the period separating two successive pulses delivered by the said pick-up, a second source of pulses of higher fixed frequency than the pulses from the first source, and a device furnishing output pulses whose period corresponds to a number of periods established by the pulses from the said second source depending on the number of pulses from the first source counted by the said counting device.

The invention is described below with reference to the attached drawings in which.

In accordance with the invention, a pick-up is provided for delivering a pulse every time the rotating device has revolved by an angle $\alpha$. The pick-up can be of any suitable type, mechanical, electromechanical, electro-optical, magnetic, etc.

The time separating two successive pulses is therefore:

$T_v = \alpha/\omega$; $\omega$ designating the speed of rotation.

With the aid of an electronic clock producing pulses at a frequency $f_R$ (or with a period of $T_R = 1/f_R$), we measure this time, i.e. we count the number of pulses $n_v$ delivered by the clock during time $T_v$.

This number $n_v$ is equal to:

$$n_v = T_v \cdot f_R = T_v/T_R.$$

When a count of this type is made, the result is placed in a buffer memory, or buffer register, which latches so that the operation can be restarted. There is also a preselection counter which counts the pulses furnished by a second clock producing pulses of a frequency $f_H$ (of period $T_H = 1/f_H$) which can count from zero to a "loaded" or preselected value, return to zero when the said value is reached, and reload itself. The counter is loaded with the value $n_v$, held in the buffer memory. The said counter thus carries out an operation from zero to $n_v$ in a time:

$$T'_v = n_v \cdot T_H = T_v \cdot T_H / T_R$$

or a frequency $$f'_v = \frac{T_R}{T_H \cdot T_v} = \frac{f_H}{f_R} \cdot \frac{\omega}{\alpha}$$

In order to know, when desired, the speed of rotation, there can be measured during a time $T_E$, the number of pulses of period $T'_v$ received. This number $n'_v$ is:

$$n'_v = \frac{T_E}{T'_v} = \frac{T_E \cdot T_R}{T_v \cdot T_H} = \frac{T_E T_R}{T_H} \cdot \frac{\omega}{\alpha}.$$

In the particular, non-limiting case, in which a single base clock is used with period $T_H$, and in which the periods $T_E$ and $T_R$ are obtained by division of the base clock frequency, we have:

$$T_E = K_E \cdot T_H \text{ and } T_R = K_R \cdot T_H$$

we obtain:

$$f'_v = K_R \cdot \omega/\alpha$$

and $$n'_v = K_E \cdot K_R \cdot T_H \cdot \omega/\alpha$$

Figure 1:
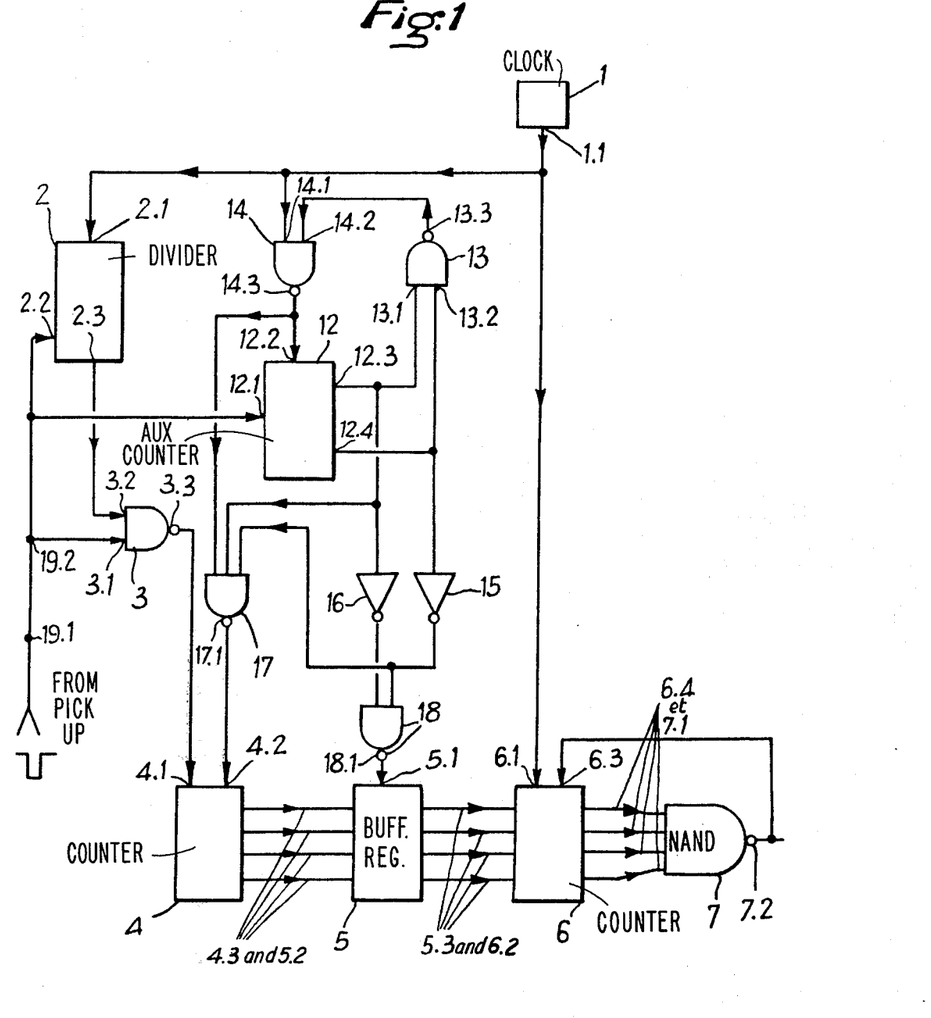
FIG. 1 is an electrical schematic diagram of an embodiment of the tachometric system according to the invention.

The operation of a practical embodiment of application of the method set forth is explained on the basis of the block diagram of FIG. 1. By way of example, the case of the use of a single base clock 1 is set forth. This clock 1 sends, through its ouptut 1.1, pulses of frequency $f_H$ to the input 2.1 of a divider 2 which divides by a factor $K_R$. Divider 2 therefore delivers at its output 2.3, pulses of frequency $f_H/K_R$; or of period $T_H \cdot K_R$. At input 19.1, connected hereto 19.2, the pulses, assumed here to be negative, from the pick-up (not shown) are applied. As explained below, another circuit can be inserted between 19.1 and 19.2.

A "NAND" gate 3 has one of its inputs 3.1 linked to point 19.1, 19.2 and the other of its inputs 3.2 to output 2.3 of divider 2. As a result, at the output 3.3 of NAND 3 there cannot be pulses of frequency $f_R/K_R$ produced at divider output 2.3 except when the signal at 19.1 is high, i.e. at times outside the pulses produced by the pick-up. The pulses emerging from NAND output 3.3 are applied to the input 4.1 of a counter 4 which indicates, therefore, at every moment on its output lines 4.3 (here shown to be four by way of example, but this is non-limiting) the number of pulses which it has received at its input 4.1. Furthermore, divider 2 receives on a suitable input 2.2, the signal from 19.2 which has the effect of resetting the divider to zero. As a result, the divider output 2.3 is synchronized with respect to the signal appearing at 19.1 (or 19.2) and, more precisely, the first pulse emerging from divider output 2.3 is produced at a time $T_R = K_R T_H$ after the pulse from 19.1.

Generally speaking, $K_R$ is large enough so there are a number of clock pulses $K_R$ between the pulse at 19.1 and the output of the first pulse at divider output 2.3. We utilize this phenomenon, via an auxiliary counter 12, to carry out a certain number of operations. The auxiliary counter 12 is likewise reset to zero, on an input 12.1 provided for this effect, by the pulse at 19.1. This zero reset has the effect of making the outputs 12.3 and 12.4 of 12 low, hence making the output 13.3 of "NAND" gate 13, whose inputs are lines 12.3 and 12.4, high. This consequently permits the passage through a "NAND" gate 14 of the $f_H$ pulses delivered at 1.1.

It follows that after the end of the signal at 19.1 we obtain the following sequence: let $t = 0$ be the moment when the signal at 19.1 ends, we have:

| t | 12.3 | 12.4 | 13.3 | 14 |
|---|------|------|------|-----|
| 0 | LOW | LOW | HIGH | passing |
| + 1 $T_H$ complete | HIGH | LOW | HIGH | " |
| + 2 $T_H$ complete | LOW | HIGH | HIGH | " |
| + 3 $T_H$ complete | HIGH | HIGH | LOW | blocked |
| + 4 $T_H$ complete | HIGH | HIGH | LOW | " |

And we thus obtain a stable state up to the next pulse at 19.1.

Figure 2:
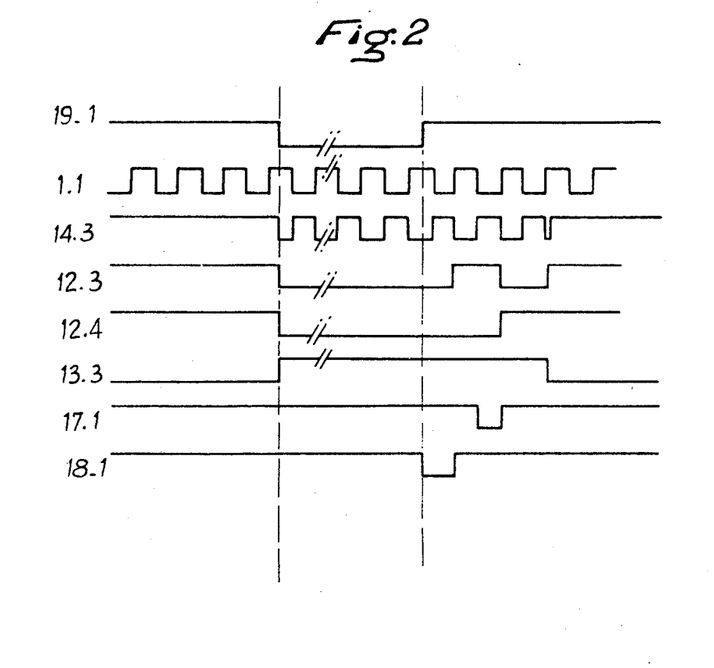
FIG. 2 is a diagram showing the state of certain points of the circuit of FIG. 1.

A diagram of this sequence appears in FIG. 2.

When the two outputs of auxiliary counter 12 are high, the pulses can no longer arrive on 12.2 which is linked to output 14.3 of NAND 14 and the state is stabilized. If we designate by A and B the signals at 12.3 and 12.4, a gate 18 receiving these signals through a pair of inverters 15, 16 forms the quantity: $\overline{A.B} = A + B$. The latter signal is produced immediately after the end of the pulse at 19.1 and lasts up to the end of the complete clock pulse (inverted by NAND 14) which follows it. The signal from gate 18 is utilized on an input 5.1 of a buffer register 5 to make it transfer to its outputs 5.3 (here also indicated as four by way of example) the number indicated on its inputs 5.2, the latter themselves linked to the outputs 4.3 of counter 4.

The result is that the counting result which has just been made is put in the buffer memory before any other pulse emerging from divider 2.3 has been able to affect the number counted by counter 4 in the course of the preceding operation.

A NAND gate 17 receives the A signal from counter output 12.3, the B from gate 15 and the signal from 14.3 of NAND 14. The signal coming from the "NAND" gate 17 at 17.1 is $A \cdot B \cdot 14.3$. It is represented in FIG. 2 and is produced for a duration $T_H$ and a time $T_H$ after the preceding one. It is used to reset counter 4 to zero before another counting starts. The "NAND" gates 17 and 18, and the inverters 15 and 16 have the function of permitting the elaboration of the said signals.

Finally, this part of the system leads to the following results.

When a pulse from the pick-up system arrives, the following operations take place:
Arrival of the pick-up pulse causes:
Zero reset (in phase) of divider 2, and blocking of counter 4.
Zero reset of auxiliary counter 12.
The end of the pick-up pulse causes:
Restart from zero of divider 2.
Transfer of the preceding result on register 5.
Then, and in distinct fashion, zero reset of counter 4.
Blocking of auxiliary counter 12.

When the first pulse emerges at divider output 2.3 the circuit is ready to operate the counting, and it will count, until the next pulse at 19.1, a number of pulses $$n_v = f_R \cdot T_V = f_F \cdot \alpha/\omega.$$

The rest of the circuit functions in the following manner. A counter 6 receives pulses from clock 1.1 on its input 6.1. It follows, then, that when the outputs 6.4 of this counter, which are linked to inputs 7.1 of a "NAND" gate 7, are all high, the output of 7.2 of NAND 7 goes low and causes the forced loading of 6 by its input 6.3. Counter 6 begins its counting to a set number. We set it to the number (by means of an internal circuit) equal to the complement, at its capacity, of the number present at the moment of the charge on the outputs 5.3 of register 5 (i.e. as it is known by the complementary data). The result is that, in order to pass from this number to the value of its capacity (all outlets 6.4 high), it is necessary that $n_v$ pulses of frequency $f_H$ arrive at 6.1. Therefore, we have the appearance at 7.2 of negative pulses of period:

$$T'_v = n_v T_H = f_R \frac{\alpha}{\omega} T_H = \frac{T_H}{K_R T_H} \frac{\alpha}{\omega}$$

or $$f'_v = \frac{K_R}{\alpha}.$$

Note that in the preceding explanation, the counting by counter 6 is blocked for the duration of the signal applied at 19.1, i.e. for the duration of the pick-up pulse. If this duration corresponds to a fixed angle, this being of no importance, it is then necessary merely to take, for the value of $\alpha$, the angle separating two pulses, less the value of the angle during which the pulse is present. This is not often the case, however, that occurs in practice with known pick-ups. We can use a duration in time, provided that the latter is very small compared to $T_v$, and is reproducible. A simple RC differentiating circuit does not generally fill the role with sufficient precision. This is why, therefore, we can insert, between 19.1 and 19.2, if necessary, the circuit of FIG. 3.

Figure 3:
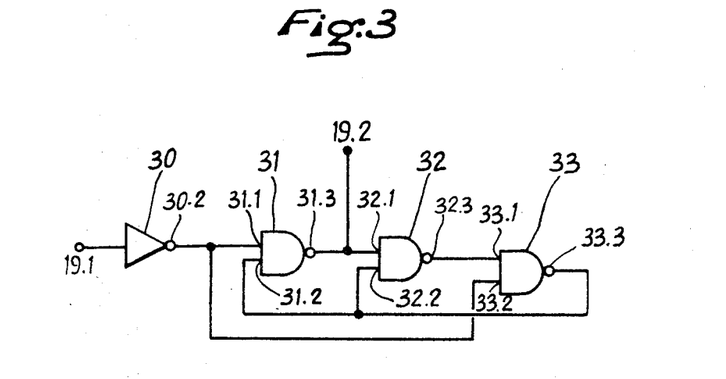
FIG. 3 is a schematic diagram of an example of an embodiment of a triggering circuit, operated by the pulse from the pick-up from the circuit of FIG. 1.

As we have seen above, in the absence of pick-up pulses the input 19.1 is high. Therefore, the output 30.2 of an inverter 30 receiving those pulses is low. This output, applied to one input 31.1 of a NAND gate 31, makes output 31.3 of NAND 31 high. Furthermore, the output 30.2 of inverter 30 is likewise applied to input 33.2 of a NAND gate 33 and likewise makes the output 33.3 of 33 high. The result is that the second input 31.2 of NAND of 31 is high, while the first is low, leaving 31.3 high. It is likewise a result that since input 32.2 to a NAND 32 is high, as well as its input 32.1 from output 31.3 of NAND 31, that output 32.3 of NAND 32 is low.

When a (negative) pickup pulse arrives at 19.1, inverter 30.2 goes high, making gate 31, whose input 31.2 is still high, see its two inputs high. This causes output 31.3 to go low making input 32.1 of NAND 32 low and hence output 32.3 high. NAND gate 33, whose input 33.2 has gone high when 30.2 went high, therefore sees its second input 33.1 likewise go high. Hence output 33.3 returns low, which causes a low conduction output 31.2 of NAND 31 and hence a high output at 31.3. Therefore, at 31.3, which is connected to point 19.2 of FIG. 1, there appears an extremely brief negative pulse, equal to the time of propagation through 31, 32, and 33. This duration, which is quite sufficient for the operations produced and described in regard to the device of FIG. 1, is negligible compared to the duration of $T_v$. When the pulse at 19.1 ceases, 30.2 goes low and places 31, 32 and 33 in the original condition.

The invention will now be described with respect to a particular example. It was demonstrated above that the frequency of the pulses delivered at 7.2 is $f'_v = K_R \cdot \omega/\alpha$ Assuming that on a shaft whose speed we wish to know, there is a pickup of a known type emitting $m$ regularly spaced signals per revolution. If we call N the speed in rpm, we have: $\omega = 2\pi N/60$, whence $f'_v = K_R \, mN/60$. The frequency of the pickup pulses itself is: $f_v = mN/60$. Consequently: $f'_v = K_R f_v$.

The frequency is therefore multiplied by the factor $K_R$ which can take considerable values, 10, 100, 1000. This is, of course, a trick based on a memory device. However, it makes it possible to know, by measurement of a high frequency, hence in a short time, the speed of the shaft according to a linear response. This is accomplished with a maximum period of $1/m$ revolution, if the pickup produces one signal per revolution. In practice, it is difficult to achieve measurement with this precision, and in a short time, with prior art devices. For example, direct measurement of the time separating two pickup signals requires, by definition, a time equal to that of the travel of $1/m$ revolution, and yields, in addition, a hyperbolic response. The direct measurement in number of signals in a given time, necessitates, in principle, in order to be precise, a large number of pickup pulses in a given time. Finally, the use of numerical techniques of the present invention provides high precision and insures very high fidelity for the system. Classic analog systems, whether mechanical (inertia devices) or electric (tachometric dynamos), are generally poorer performers, while introducing response time constants which are nonnegligible, i.e. significant errors.

All devices requiring a rapid precise and faithful tachometric measurement are therefore capable of profitably utilizing the system just described. More particularly, for devices commanding or controlling the speed of a rotating body, for example, the system described alone can be utilized with profit. For the regulation of functions such as ignition, or fuel injection in an internal combustion motor, it will also be possible to use it, and do so even more profitably if the computer is of the numerical type accepting information relative to the speed of the motor in the form of a frequency. Such devices have been described and are known. A particular example of application of the invention is, however, that of angular control.

It has been demonstrated above that if: $T_v = \alpha/\omega$ is the period of the pickup signals, the period of the signals at 7.2 is:

$$T'_v = \frac{\alpha}{\omega} \cdot \frac{T_H}{T_R}$$

During this time, the rotating device rotates by an angle $\beta$ $$\beta = T'_v \cdot \omega = \alpha \cdot \frac{T_H}{T_R} = \frac{\alpha}{K_R}$$

Hence, a mechanical angle $\alpha$ on the shaft is matched linearly by an angle $\beta$. $K_R$ times smaller, $K_R$ being the ratio of two frequencies and therefore independent of the absolute value of these frequencies. This means that in the particular case of a single base clock, the ratio $\alpha/\beta$ is independent of the frequency of the said clock. This is an important point.

The choice is not arbitrary, however. It is guided, as a matter of fact, by the required precision and the capacity of the counters and registers 4, 5, 6 in FIG. 1. In fact, counter 4 can register only a whole number, now, in view of the evaluation of $T_v$, the number $n_v$ is known within one unit (by default).

$$n_v = \frac{\alpha}{\omega} f_R = 2\pi \cdot \frac{60}{2\pi N} \cdot f_R = \frac{60}{m \cdot N} \cdot f_R$$

hence $$\frac{dn_v}{dN} = \frac{-60 f_R}{m} \cdot \frac{1}{N^2}$$

for $$dn_v = 1 \quad \left| \frac{dN}{N} \right| = \frac{m}{60 f_R} \cdot N = \frac{1}{n_v}$$

It follows that the relative error introduced is greater as the speed is higher, or, if we prefer, the method is the more precise as the speed is lower. If we assume, at a maximum speed $N_M$ a (relative) error $\epsilon_M$ $$\epsilon_M = \frac{m}{60 f_R} \cdot N_M = \frac{1}{n_v} \text{mini}$$

we therefore need $$f_R \geq \frac{m}{60} \cdot \frac{N_M}{\epsilon_M}$$

This means, for example, that if we wish to know, with an approximation of better than 1%, at maximum speed, the speed of a rotating body covering a range of speeds of 1 to 10, we must provide a capacity of 1000 (or $2^{10}$, or 10 bits) on counter 4. But at minimum speed, the uncertainty will be less than 0.1%. Moreover, if we modify both $f_H$ and $f_R$, in the same proportion, ($K_R$ constant) the signal indicating the speed or the angle will remain valid, only the uncertainty varies.

We can then proceed, in the course of sampling, to a change of frequency. Call $n_1$ the capacity of the counter 4 in FIG. 1. Assume that we are to measure a time $T_v = n_2 T_R$, with $n_2$ greater than $n_1$, for example $n_2 = 3.6 n_1$. We can proceed in the following manner.

First, we begin measuring $T_v$ at normal frequency $f_R$, at the end of a time $t_1$ $$t_1 = n_1 T_R = n_1/f_R$$

The counter 4 is at maximum capacity. At this instant we divide the frequency $f_R$ by 2 (or by some other factor) and we divide by 2 the number which is marked on the counter. The counter 4 will then pass to $n_1/2$ and begin to count again at the frequency $f_R/2$. At the end of a number of pulses, $n_1/2$ it is again at its maximum capacity $n_1$, and during this new counting, a time $t_2$ has elapsed:

$$t_2 = n_1/2 \cdot 2/f_R = n_1 T_R$$

the accumulated time is therefore $t_1 + t_2 = 2n_1 T_R$. We then reduce the number at the output of the counter from $n_1$ to $n_1/2$ and we again divide the frequency by 2. The counter begins to count again from $n_1/2$ at the frequency $f_R/4$. The counter marks:

$$n_1/2 + 1 \cdot n_1/2 + 2 \ldots$$

and the accumulated time is then:

$$2n_1 T_R + 4T_R \; 2n_1 T_R + 8T_R \; 2n_1 T_R + 12 T_R \ldots$$

the counter stops when it marks $n_1/2 + n_3$ such that:

$$2n_1 T_R + 4n_3 T_R = n_2 T_R = 3.6 n_1 T_R$$

in the sample chosen:
say $$4n_3 = (3.6 - 2) n_1 = 1.6 n_1$$

$$n_3 = 0.4 n_1.$$

The number marked by the counter is:

$$n_1/2 + n_3 = 0.9 \, n_1.$$

That is to say that this is exactly the number which would be marked if we had counted $T_v$ at frequency $f_R/4$.

Generally speaking, if, in order to evaluate a time, between pickup signals, longer than the time equal to the capacity of the counter 4 multiplied by $T_R$, we divide by 2 the number marked by the counter each time that it is at the maximum of its capacity, and we restart the counting from $n_1/2$ at a frequency divided by 2 each time.

$$(f_R, \frac{f_R}{2}, \frac{f_R}{4}, \ldots \ldots \frac{f_R}{2^i}),$$

the number marked by the counter at the end of $T_v$ is equal to the number which we would have obtained by counting $T_v$ from the zero counting point and for the entire duration of $T_v$ at the last frequency used. The result is that if, after transfer by buffer 5, we apply at 6, pulses not of frequency $f_H$ but of frequency $f_H/2i$, the frequency $f'_v$ delivered by 7 will be correct.

Figure 4:
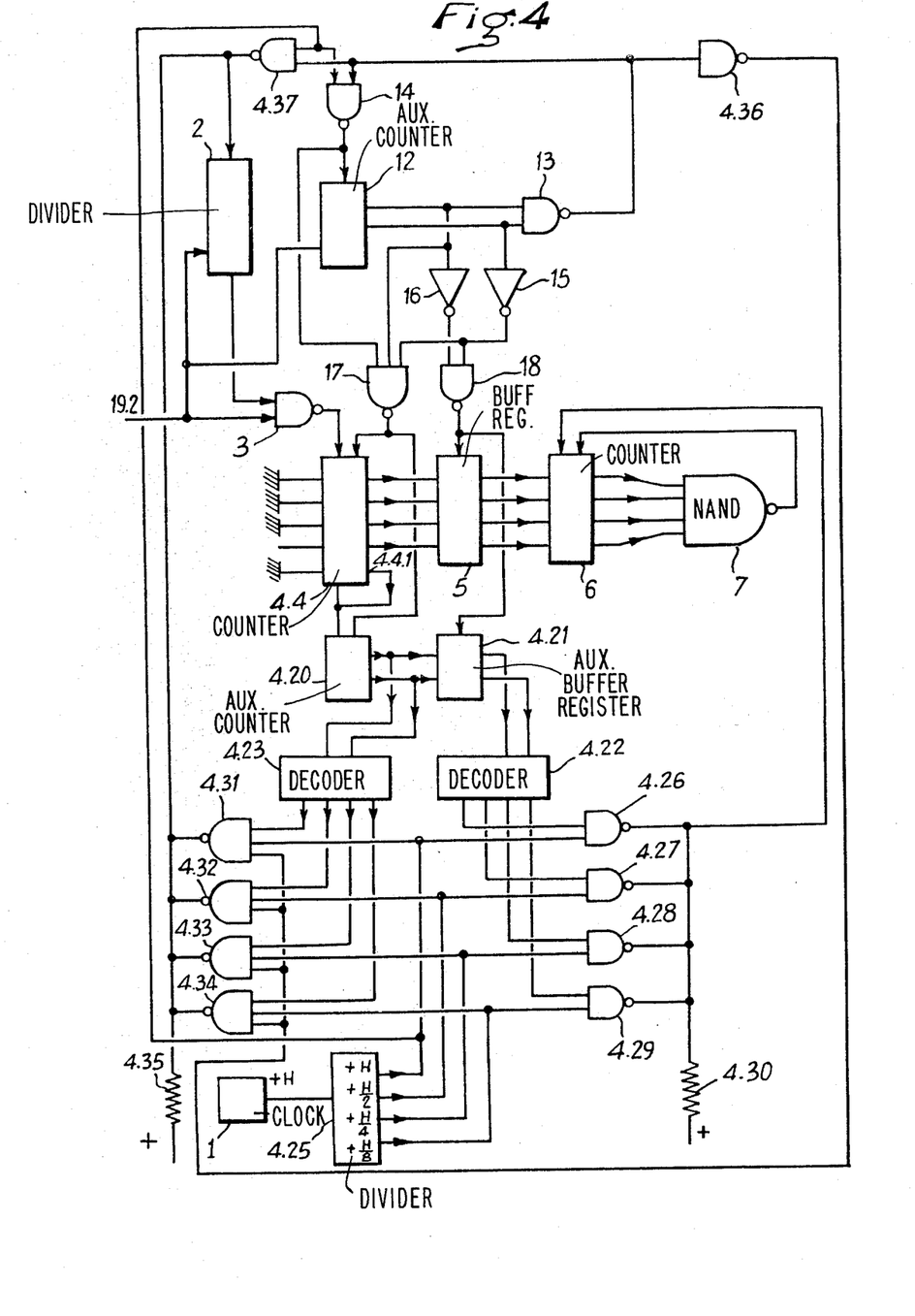
FIG. 4 is an electrical schematic diagram of an example of an embodiment of an automatic counting device according to the invention for producing successive divisions of the counting frequency.

We can, therefore, by this arrangement, measure speeds varying within a wide ratio while retaining a limited capacity for counter 4. An automatic device utilizing this arrangement is represented in FIG. 4. The elements bearing the same reference numbers as those in FIG. 1 have the same role, and are identical. The clock 1 furnishes pulses of frequency $f_H$ to a circuit 4.25 a divider element which furnishes, at its outputs $$f_H, \frac{f_H}{2}, \frac{f_H}{4}, \frac{f_H}{8}$$

(limited here to this level by way of example only).

Counter 4 is replaced by counter 4.4 with preselection.

When a pulse arrives at 19.2, there is a transfer on buffer register 5 as indicated with respect to FIG. 1, and likewise a transfer on an auxiliary buffer 4.21, the role of which is described below. Then as in FIG. 1, there is a reset to zero of 4.4 and of 4.20, which is an auxiliary counter. Element 4.23 is a decoder (here of the so-called "1 from 4" type).

A plurality of "NAND" gates 4.31, 4.32, 4.33, 4.34, 4.36, 4.37 of the open collector type are arranged in the "or connected " mode. As we have seen, at the moment of the arrival of a pulse at 19.2, the output of NAND 13 goes high, hence the output of NAND 4.36 goes low, which blocks all the NAND gates 4.31 to 4.34 inclusive. Gate 4.37, having one of its inputs coupled to the output of circuit 4.25, producing frequency $f_H$, and the other input coupled to the output of 13, allows divider 2 to immediately receive pulses of frequency $f_H$. Decoder 4.23, after zero reset of auxiliary counter 4.20, receives the information zero at its inputs, which corresponds to a high output. The output of 4.23 is coupled to NAND 4.31 so that if the output of NAND 13 passes low after the program of transfer and zero reset, the pulses $f_H$ will reach divider 2 via NAND 4.31 when gate 4.37 is switched to the blocked condition by the low output of 13.

Counter 4.4 thus begins from the start to furnish counting pulses at the frequency of $f_H/K_R$, $K_R$ being obtained as discussed in regard to FIG. 1, by divider 2. When time T is long enough, the counter 4.4 will mark, successively 0, 1, 2, 3, ... 15, 16. When it marks 16, in the case of the figure (we could, obviously, use any other capacity) the output $2^4$ (16) marked 4.4.1 is high.

The resulting pulse is transmitted to auxiliary counter 4.20 on the one hand and to the forced charge input of counter 4.4 on the other hand. At counter 4.20 the result is that its output passes from 0 to 1. Consequently the ouput of decoder 4.23, which is connected to gate 4.31, passes from high to low and blocks gate 4.31 while the output linked to gate 4.32, and it alone, passes from low to high so that 4.32 is unblocked and divider 2 recieves, from this moment on, $f_H/2$ instead of $f_H$. Moreover, the charge pulse causes counter 4.4 to pass from 16 to 8. There is shown at the left of block 4.4 the charge inputs corresponding to the outputs opposite. These have been coded 00010, or 8.

As a result, the output of 4.4 starts from 8 again and counts to $f_H/2K_R$ instead of $f_H/K_R$. Each time that 16 ($n_1$) is reached, the process if repeated, and counter 4.4 repasses to 8, while via gates 4.33, 4.34 the frequency changes from $f_H/2K_R$ to $f_H/4K_R$, $f_H/8K_R$.

The generalization is obvious. Assuming that at the end of the counting of $T_V$, we use $f_H/4$. It is then necessary that counter 6, after transfer, also receive the frequency $f_H/4$. For this, on the arrival of the transfer pulse, we transfer, to the output of buffer 4.21, the last number from 4.20. The second decoder 4.22 then receives the code equal to the last code from 4.23 and hence, via gates 4.26 to 4.29, it insures, until the next transfer, that counter 6 will be fed at the same frequency as the last one used at divider 2. The resistances 4.30 and 4.35 have the sole function of defining the high state of the "or connected" gate units.

An example will demonstrate the process:

let $N_M$ = 7500 rpm $\epsilon_{max}$ = 2% m = 2 (2 pulses per revolution)

hence:

$f_R = 2/60 \cdot 7500 \times 100/2 = 750,000/60 = 12.5$ KHZ desired factor of angular division $K_R = 180$ (1° for 180°) we have:

$f_H = f_R \times 12.5 \times 180 = 2.25$ MHZ $n_{vmini} = 1/\epsilon_{Max} = 50$.

Where the capacity of the counter is 8 bits, the highest point $2^7 = 128$. $N_{minimum}$ measured for the required precision according to the formula established above is given as:

$$N_{mini} = \frac{7500 \times 50}{128}, \text{ or } P = \frac{128}{50} = 2.56.$$

Number of bits in the counter 4.20: 2 bits.
The ratio $P_{total}$ is therefore: $2.56 \times 2^3 = 20.48$.
Minimum speed: 7,500 ; 20/48 = 367 rpm.
Below is summarized the performances of this arrangement:

| N | 62,500 | 25,000 | 15,000 | 12,500 | 10,000 | 7,500 | 6,000 | 5,000 | 4,000 | 3,000 |
|---|---|---|---|---|---|---|---|---|---|---|
| ε | 16.7% | 6.7% | 4% | 3.3% | 2.7% | 2% | 1.6% | 1.3% | 1.05% | 0.8% |

For the first automatic change of frequency and we obtain the rest of the measurement:

| N | 2,930 | 2,500 | 2,000 | 1,500 | 1,464 |
|---|---|---|---|---|---|
| ε | 1.6% | 1.3% | 1.1% | 0.8% | (second change of frequency) |

For the second change of frequency we have:

| N | 1,464 | 1,400 | 1,300 | 1,250 | 1,100 | 1,000 | 900 | 800 | 750 | 732 |
|---|---|---|---|---|---|---|---|---|---|---|
| ε | 1.6% | 1.5% | 1.4% | 1.3% | 1.2% | 1% | 0.9% | 0.8% | 0.8% | (third change of frequency) |

For the third change in frequency, we have:

| N | 732 | 700 | 600 | 500 | 450 | 400 | 367 |
|---|---|---|---|---|---|---|---|
| ε | 1.6% | 1.5% | 1.3% | 1.05% | 0.9% | 0.8% | 0.8% |

We can observe the precision of the method, which we can extend as far as we wish, as a matter of fact, by raising frequencies (frequencies of 10 MHZ are common at present) and the capacity of the counters.

However, in the example chosen, we have shown that with the system described, we can match 180° of rotation of the shaft by a signal corresponding to 1° (multiplication factor 180) with an approximation of better than 1.6%, within the range of 367 to 6000 rpm, the error amounting to 2% at 7500 revolutions, and only 4% at 15,000 rpm, using a pick-up system that gives out only two signals per revolution of the shaft.

The applications of this device are numerous, for example a high-frequency pulse system for examination of a cyclic phenomenon. Others include utilization for angular control of certain functions of an internal combustion motor. For example, for a combustion motor with a fuel injection device utilizing a mass flowmeter on the air indrawn, it is recommended to inject fuel, in the case of a synchronized injection system of the motor with constant momentary flow, during a given angle for each reading of the flowmeter, in order to maintain a given fuel-air mixture. With the process just described, it would be sufficient to inject fuel, for example, once per motor cycle, i.e. at the frequency of the pick-up pulse signals of the example, divided by 4, triggering the injection by the first pulse at gate output 7.2 immediately following a signal giving the order to inject, and then to count a number of pulses issuing from 7.2 which would be dictated by the flowmeter.

Another example of application for such a device is that for controlling the ignition point or time. To do this, it will be advantageous to proceed as follows. A pick-up such as those in the examples described above, can be mounted on the cam shaft. The signals from the pick-up trigger computation of the angular retard at the ignition point according to the arrangement in FIG. 5.

Figure 5:
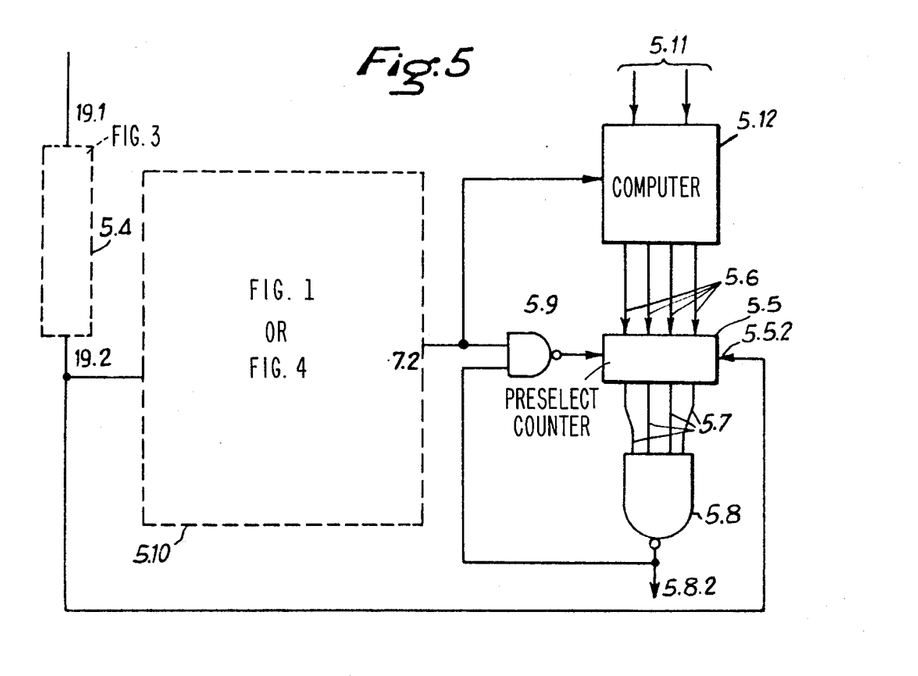
FIG. 5 is a diagram of an application of the invention to the control of the ignition point of an engine having a fuel injection system.

In FIG. 5, circuit 5.4 is the one shown in FIG. 3, Circuit 5.10 is the one of FIG. 1 or 4. The parameters that are to regulate the ignition advance are introduced at 5.11 to a computer circuit 5.12. Additionally, via output 7.2 of circuit 5.10, the circuit 5.12 likewise receives motor speed information because this quantity generally governs the ignition advance. Finally, computer 5.12 is a circuit producing, on its outputs 5.6, a number representing at every moment the angular retard to be introduced between the moment when a pick-up signal exists, and that when the ignition is to be triggered. Computer 5.12 does not form part of the present invention. Computers of a type suitable for performing this function are known.

Circuit 5.5 is a preselection type counter capable of counting pulses from a number charged, or set, at 5.6 from a signal applied at input 5.5.2. When the pick-up signal transmitted via circuit 5.4 arrives at 5.5.2, the counter 5.5 is charged to the number present at 5.6 which has the effect of causing at least one of the outputs 5.7 to go low. A gate 5.8 therefore has a high output 5.8.2 and, since it applies a high signal on one of the inputs of NAND gate 5.9, it allows the pulses coming from 7.2 to pass through the gate 5.9.

When counter 5.5, which progresses according to the pulses from output 7.2 of circuit 5.10, reaches saturation, that is its maximum count, all the outputs 5.7 are high. Then, gate 5.8.2 goes low and blocks pulses 7.2 at NAND 5.9.

If we let $N_A$ designate the number present at 5.6 at the moment preselect counter 5.5 is charged and $N_B$, the capacity of 5.5, output 5.8.2 remains high during a time equal to:

$$[N_B - N_A]T'_v,$$

and during this time the motor revolves one cycle equal to $(N_B - N_A)\beta$. We thus obtain, indisputably, with the precision selected for the proportioning of the elements of 5.10, an angular control of the ignition advance programmed by $N_A$, and capable in the example described, of a power of resolution of 1° of crankshaft.

For this kind of use, it is advantageous to make two alterations in circuit 5.10.

First of all, in order to avoid any error (maximum = $\beta$) in the computing of the angle, counter 6 of FIG 1 is synchronized in such a way that the first period at 7.2 ($T'_v$) will begin at the same moment as the signal at the input 6.2 of counter 6. To do this, we use the modification shown in FIG. 6.

Figure 6:
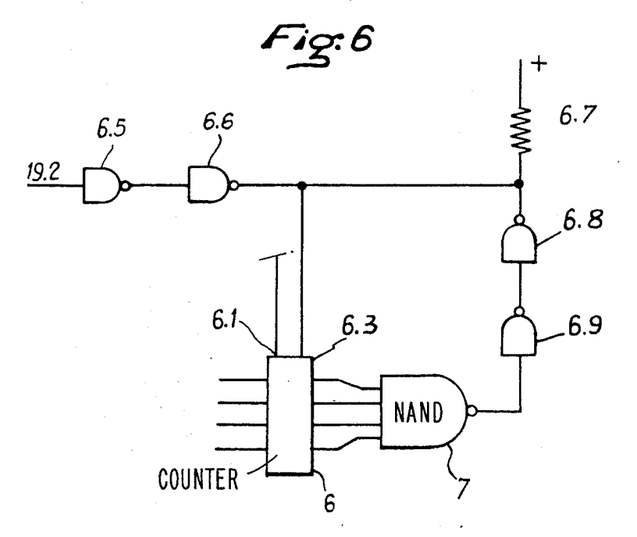
FIG. 6 is a diagram of a safety circuit for computing angles to be inserted into the circuit of FIG. 1.

The arrangement in FIG. 1 or FIG. 4 not being altered, we use the pulse at output 7.2, inverted twice by inverters 6.9 and 6.8, to produce a pulse having the same polarity. Circuit 6.8 is an inverter with open collector. We likewise invert the pulse at 19.2 two times by inverters 6.5 and 6.6, inverter 6.6 having an open collector. Inverters 6.8 and 6.6 share a resistance 6.7 in an "or connected" mode, in such a way that the charging of counter 6 will take place normally with each pulse from 7.2, but also with the appearance of the pulse at 19.2.

A second addition consists in inserting, during the start-up (starter energizing in the case of a motor control) a divider between clock 1 and counter 4.25 in FIG. 4. This divider is normally unused, and is used only during the starting period, in such a way as to permit controlling extremely low speeds. For example, if we introduce a scale of 16 divider, the computation of the motor ignition point is correct up to 22 rpm, in the example described.

Figure 7:
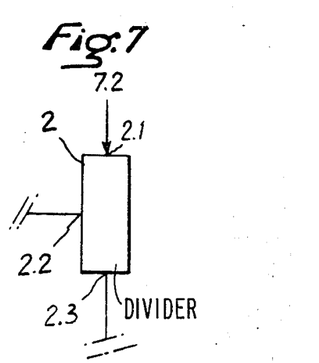
FIG. 7 is a diagram of a modification of the circuit of FIG. 1 for producing a non-linear response.

It is possible to obtain a non-linear resonse with the system. For example, we can have the system operate with a reaction loop by supplying the frequency divider 2 in FIG. 1 with the pulses emerging from 7.2, and not with the clock pulses. This is shown in FIG. 7. The divider input 2.1, instead of being linked to the clock output 1.1, is linked to 7.2. In this case, we will preferably synchronize counter 6, as shown with respect to FIG. 6.

The zero reset and transfer system is unchanged and supplied with the clock frequency at 14.1.

Here $T_v = n_v T'_v \cdot K_R$ since the period of the pulses at 2.1 is not $T'_v$. Moreover, $T'_v = n_v T_H$, hence $$T_v = \overline{n_v^2} \cdot K_R \cdot T_H$$

or $$n_v = \sqrt{\frac{T_v}{T_H} \cdot \frac{1}{K_R}}$$

or $$T_v = \frac{T'_v}{T_H} \cdot T'_v \cdot K_R = \frac{T'^2_v}{T_H} K_R \cdot T_v = \sqrt{\frac{T_v T_H}{K_R}}$$

which can be written $$f'_v = \sqrt{\frac{K_R}{T_H}} \sqrt{f_v} .$$

Finally, it is possible, as we know, to alter the relation between $T'_v$ and $n_v$, by inserting a matrix between buffer register 5 and counter 6 (FIG. 1). Under these conditions, the matrix, by some law associates, with a number $n_v$, a number $m_v$ and we have:

$$m_v = f(n_v), f(\ ) = \text{some function}$$

or, again $$n_v = g(m_v), g(\ ) = \text{inverse function of } f.$$

We will therefore obtain, in "open loop":

$$T'_v = \frac{1}{f'_v} = T_H m_v = T_H \cdot f \left(\frac{T_v}{K_R T_H}\right) .$$

We can also have the system work with closed loop:

$$T_v = n_v T'_v K_R$$

$$T'_v = T_H m_v = T_H f(n_v)$$

$$T_v = n_v f(n_v) \cdot K_R T_H$$

or $$T'_v = 1/K_R \cdot T_v/n_v$$

$$n_v = g(m_v) = g(T'_v/T_H)$$

$$T'_v = g(T'_v/T_H) = T_v/K_R.$$

We have shown, in the preceding description of the tachometric circuit, that we had, in the buffer memory, a number $n_v = T_V/T_R$ and that from this number, by means, for example, of a pre-selection counter, charged at $n_v$ and looped on itself, we could obtain a time $$T'_r = n_r T_H.$$

It is interesting now to obtain, for example, in the case of the control of an ignition system or an angular control of a fuel injection system (with metering of the air flow intake, for example), an approximate value of the time $T'_v$, such that after a certain number of measurements of this approximate value, the average value will be correct.

To do this, we proceed by forming times $T_v^x$ and depending on the bits of highest weight of $n_{vx}$, but varying slightly so that the average value of $T_v^x$ will be correct. Take a number $n_v$, the result of a sampling, which can be written as:

$$n_v = a_0 2^0 + a_1 2^1 + \ldots + a_j 2^j + a_n 2^n$$

with $a_0, a_1 \ldots a = 0$ or $1$.

We form the number:

$$n_v^x = a_j 2^0 + a_{j+1} 2^1 + \ldots + a_n 2^{n-j}.$$

We have, then:

$$n_v = 2^j n_v^x + \epsilon$$

with $$0 \leq \epsilon < 2^j.$$

We form times $T_v^x$ such that:

$$T_v^x = n_v^x T_H - {}_0+{}^1) T_H$$

with $$T_v^x = n_v^x T_H + \epsilon^x T_H \text{ with } \epsilon^x = 0 \text{ or } 1.$$

That is to say that $T_v^x$ is defined to within one clock pulse $T_H$. We set the circuit so that after $2^j$ values of $T_v^x$ we will have:

$$T_v^{x1} = n_v^x T_H + \epsilon_1^x T_H$$
$$T_v^{x2} = n_v^x T_H + \epsilon_2^x T_H$$
$$T_v^{x2j} = n_v^x T_H + \epsilon_2^x{}^j T_H.$$

So that:

$$\sum_1^{2^j} T_v^x = 2^j n_v T_H + T_H \sum_1^{2^j} \epsilon^x$$

with $$\Sigma \epsilon^x = \epsilon.$$

This boils down to saying that a frequency $2^j$ times higher, we have a value of $T_v^x$ approximating the fraction of $T'_v/2^j$ and such that after $2^j$ measurements, the average value of $T_v^x$ will be equal to $T'_v/2^j$.

The pickup pulses, which may be shaped by a circuit such as the one in FIG. 3, arrive at a gate 8.3 (FIG. 8), and cause the reset to zero of a counter divider 8.1. A gate 8.2 at the output of divider 8.1 permits coding a number at 8.1, by a factor of division of $T_R$ which is applied to the clock input of 8.1. When the number thus coded is reached, divider 8.1 recycles according to a known method. The same pulse whose period we wish to measure, is applied via 8.6 to storage or latching circuits 8.10, 8.11, 8.12 for transfer to their output of the information existing at their respective inputs.

Figure 8:
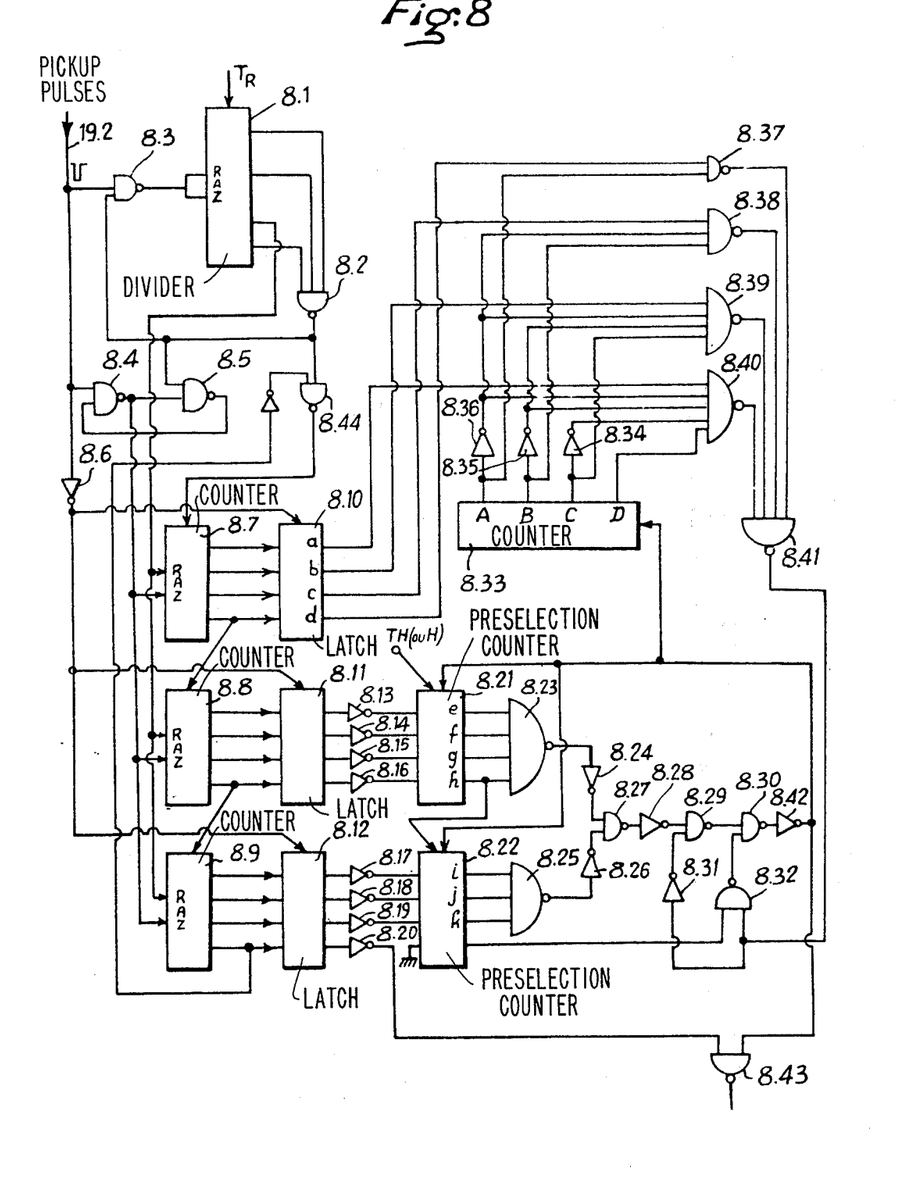
FIG. 8 is a diagram of a circuit derived from the one of FIG. 1 for the establishing of a value approximating the period of the pulses to be measured.

The counters of the number $n_v$ are 8.7, 8.8, and 8.9, which are connected in cascade. The first counter 8.7 receives, through a gate 8.44 on its clock input, the pulses from 8.2, i.e. at frequency $f_R$ divided by the number coded at 8.1, 8.2. An RS type flip flop formed by gates 8.4 and 8.5, changes state on the arrival of the pulse whose frequency is being measured, the output of 8.4 going high. This flip flop changes state again when 8.2 delivers the first pulse, i.e. after a cycle of 8.1. During this first cycle, the high output of 8.4 is applied to one of the zero-reset inputs (Z) of counters 8.7, 8.8, 8.9. In a large number of counters there are two zero reset inputs which should be high simultaneously if the operation is to take place. The description given here for explanation should not be considered as limiting.

In the course of this same first cycle of counter divider 8.1, one of its outputs goes high and it is applied to the other zero-reset input (R) of counters 8.7, 8.8, 8.9 so that this zero reset will take place in the course of the said first cycle of 8.1. After a transfer, we thus have, on the outputs of the storage, or latching, circuits 8.10, 8.11, 8.12, the number $n_v$. If the speed to be measured is below the measuring threshold, i.e. leading to a number $n_v$ higher than the capacity of counters 8.7 to 8.8, the last output of counter 8.9 will pass high and block, through an inverter, the gate 8.44, thus preventing the application of the pulses, emerging from 8.2, to the clock input of 8.7.

Let $a, b, c, d$, be the bits of smallest weight of $n_v$ (4 in this non-limiting case being described). Counter 8.33, a counter with 4 bits A, B, C, D and the gates and inverters 8.34 to 8.41, are connected in such a way that we have, at the output of gate 8.41, the value $S_1$:

$$S_1 = \overline{Ad}.\overline{ABc}.\overline{ABCb}.\overline{ABCD}.a =$$
$$Ad + \overline{A}Bc + \overline{AB}Cb + \overline{ABC}Da.$$

It follows that, during a cycle of counter 8.33, $S_1$ is high: one time out of 2 if bit $d$ is high; plus one time out of 4 if bit $c$ is high; plus one time out of 8 if bit $b$ is high; and plus one time out of 16 if bit $a$ is high.

Finally, in the case selected, $S_1$ is high in proportion $$\frac{a + 2b + 4c + 8d}{16}.$$

with $a, b, c, d = 0$ or $1$.

Furthermore, the seven following bits of $n_v$ are applied to the set, or charge, inputs of the pre-selection counters 8.21, 8.22. The eighth bit is a "guard" bit and the fourth bit of 8.22 being coded low at the input. The arrangement of 8.23, 8.25, 8.24, 8.26, 8.27 is such that, at the output of 8.28 we have:

$$S_3 = e \cdot f \cdot g \cdot h \cdot i \cdot j \cdot k.$$

If $e \ldots k$ are the seven bits following the fourth of $n_v$ and if we let W designate the last output of 8.22 (coded low at the output) we have:

Output of 8.32 =

-continued

Output of 8.29 = $\overline{S_1.W}$

Output of 8.30 = $\overline{\overline{S_1.S_3}}$ $\overline{\overline{S_1.W} \cdot \overline{S_1.S_3}} = S_1.W + \overline{S_1.S_3}$ That is to say that if $S_1$ is low, a pulse for resetting counters 8.21 and 8.22 (via 8.42) appears at the end of a time $T_v{}^x = n_v{}^x T_H$, and if $S_1$ is high, after a supplementary pulse, i.e.

$$T_v{}^x = (n_v{}^x + 1) T_H.$$

Let $$[n_v = a_0 + a_1.2 + a_2 2^2 + \ldots a_{10} 2^{10}].$$

If $S_1$ is low, there is a reset when counters 8.21, 8.22 mark:

d f g h i j k =
1 1 1 1 1 1 1.

We have:

$a_0 = a, a_1 = b, a_2 = c, a_3 = d.$

We set 8.21 and 8.22 to:

$\overline{a_4}, \overline{a_5}, \overline{a_6}, \overline{a_7}, \overline{a_8}, \overline{a_9}, \overline{a_{10}},$ 8.21 and 8.22 therefore count a number of $T_H$ equal to:

```
1111111 − (a̅₄, a̅₅, a̅₆, a̅₇, a̅₈, a̅₉, a̅₁₀) =
                1    1   1   1   1   1   1
         +     a₁₀  a₉  a₈  a₇  a₆  a₅  a₄
         +      0    0   0   0   0   0   1
         =1    a₁₀  a₉  a₈  a₇  a₆  a₅  a₄
```

Let $T^x{}_{Low\ v} =$ $$(a_4 + a_5 2 + a_6 2^2 + a_7 2^3 + a_8 2^4 + a_9 2^5 + a_{10} 2^6) T_H.$$

That is to say: $T^x{}_{low\ v}$ = approximate value of $T'_v/2^4$. If $S_1$ is high, $T_v{}^x$ assumes the value $T^x{}_{High\ v} = T^x{}_{Low\ v} + T_H$. Since the output pulse from 8.30 (inverted at 8.42) is applied to 8.33, we have, after $2^4$ cycles of 8.21 and 8.22:

$$\sum_{1}^{16} T_{H,Bv}{}^x = 2^4 a_4 + 2^5 a_5 + \ldots 2^{10} a_{10} + 8 3 + 4 c + 2 b + a$$

$$= a_0 + a_1 2 + a_2 2^2 + \ldots a_{10} 2^{10} = T'_v$$

Hence we incontestably have:

$$T_v{}^x{}_{mov} = \frac{\sum_{1}^{16} T_H{}^x{}_{,Bv}}{2^4} ** \frac{T'_v{}^1}{2^4}$$

We collect these pulses at the output of 8.43, which can be blocked by the twelfth bit of $n_v$. That is to say that if the speed to be measured is very low, we block the output (equivalent to zero speed).

What is claimed is:

1. In a tachometric system for a rotary device of the type including a pickup for delivering a pulse each time the rotary device has revolved by a given angle the improvement comprising first means (2.3) for producing pulses at a given frequency synchronized with the pickup pulses, means (4) for counting the number of pulses produced by said first means during a period separating two successive pulses delivered by the said pickup, second means (1) for producing pulses at a frequency greater than the frequency of the pulses from the first means, and output means (5,6) for producing output pulses whose period between two of its successive output pulses corresponds to a number of periods between successive pulses from said second means depending on the number of pulses from said first means counted by the said counting means, a plurality of serially connected counting means (8.7 to 8.9), a respective storage means (8.10 to 8.12) connected to the output of each of said counting means for producing a number formed by a plurality of bits, one of said storage means (8.10) corresponding to the bits of lowest weight, logic circuit summation means (8.37 to 8.41), said one storage means (8.10) coupled to said logic circuit summation means, and preselection counter means (8.21 and 8.22), the other of said storage means (8.11, 8.12) connected to said preselection counter means and said preselection counter means connected to said counting means (4) for making the period of the output pulses from said output means (5,6) correspond to a number of periods of the second pulses from said second means (1) depending on the number formed by the bits of greater weight from said storage means, the bits of lesser weight intervening only as correction elements.

2. A system as in claim 1 wherein the means (5,6) for producing the output pulses includes a further preselection counter means (6) and a buffer register means (5), said buffer register means (5) receiving the number counted by the counting means (4) and supplying it to said further preselection counter means.

3. A system as in claim 2 further comprising logic circuit means (12) responsive to each pulse from the pickup for causing successively, the transfer of the corresponding number received from said counter means and stored in said buffer register means from the input to the output of the buffer register means (5) and the reset to zero of the counting means (4) before the arrival of the pulse from said first means (2) following the pulse from the pickup means.

4. A system as in claim 2 further comprising memory means located between said buffer register means and said preselection counter means.

5. A system as in claim 3 wherein said logic circuit means (12) includes auxiliary counter means.

6. A system as in claim 3 wherein said logic circuit means includes flip flop means.

7. A system as in claim 1 wherein said first means for producing said pulses includes first divider means (2), second divider means (4.25) receiving said pulses from said second means for producing a plurality of division ratios supplying input signals to said first divider means, a limited-capacity counting means (4.4) for receiving the signals from said second counting means and counting at decreasing frequencies, the number counted and the frequency of counting of said limited capacity counting means being divided by a given factor each time that said counting means reaches its maximum capacity, the said periods of the pulses of said second means used by said limited capacity counting means furnishing the output pulses 5,6) corresponding to the last frequency delivered by the second divider means (4.25) before the arrival of the preceding pulse from the pickup device (19.2).

8. A system as in claim 1 wherein said logic circuit summation means includes means for periodically prolonging the period of the output pulses by a period of the pulses of said second means so that the average period of the output pulses will correspond to the number counted by the serially connected counting means (8.7 to 8.9).

9. A system as in claim 1 further comprising means responsive to the highest weight bit from the said serially connected counting means (at 8.44) for controlling the application of the pulses from the fitst means to the said counting means (4) to prevent the counting from continuing beyond the capacity of said counting means.

10. A system as in claim 1 further comprising means responsive to the bit of highest weight from the buffer register means for blocking (at 8.20 – 8.43) the furnishing of output pulses from the output means when the counting means (4) has counted a number of pulses corresponding to its maximum capacity.

11. A system as in claim 1 for adjustment of the ignition advance of a combustion motor further comprising computer means (5.12) for receiving the adjustment parameters of the motor on its input and for delivering at its output a number representing at every moment the angular retard to be introduced between the start of the pickup pulse and the start of the signal triggering the ignition, and second preselection counter means (5.5) programmed by the said computer means counting said output pulses and delivering a signal for the angular control of the ignition advance.

* * * * *